(12) United States Patent
Manjunath et al.

(10) Patent No.: US 9,183,004 B2
(45) Date of Patent: Nov. 10, 2015

(54) SYSTEM AND METHOD FOR REPRESENTING USER INTERACTION WITH A WEB SERVICE

(75) Inventors: Geetha Manjunath, Karnataka (IN); Ajay Gupta, Karnataka (IN)

(73) Assignee: Hewlett-Parkard Development Company, L.P., Houston, TX (US)

( * ) Notice: Subject to any disclaimer, the term of this patent is extended or adjusted under 35 U.S.C. 154(b) by 120 days.

(21) Appl. No.: 13/260,291

(22) PCT Filed: Jun. 5, 2009

(86) PCT No.: PCT/IN2009/000327
§ 371 (c)(1),
(2), (4) Date: Sep. 24, 2011

(87) PCT Pub. No.: WO2010/140160
PCT Pub. Date: Dec. 9, 2010

(65) Prior Publication Data
US 2012/0096148 A1   Apr. 19, 2012

(51) Int. Cl.
| | |
|---|---|
| *G06F 15/173* | (2006.01) |
| *G06F 9/44* | (2006.01) |
| *H04L 29/08* | (2006.01) |
| *H04L 12/26* | (2006.01) |
| *G06F 11/34* | (2006.01) |
| *H04N 21/442* | (2011.01) |

(52) U.S. Cl.
CPC ........ *G06F 9/4443* (2013.01); *H04L 29/08675* (2013.01); *G06F 11/34* (2013.01); *H04L 43/04* (2013.01); *H04L 67/22* (2013.01); *H04N 21/44222* (2013.01)

(58) Field of Classification Search
CPC ... H04L 29/08675; H04L 43/04; H04L 67/22; G06F 11/34; H04N 21/44222
USPC .................. 709/203, 219, 224; 715/704, 738
See application file for complete search history.

(56) References Cited

U.S. PATENT DOCUMENTS

| | | | |
|---|---|---|---|
| 6,877,007 B1 * | 4/2005 | Hentzel et al. ................ 709/224 |
| 6,947,979 B1 * | 9/2005 | Pon ............................... 709/223 |
| 7,363,368 B2 | 4/2008 | Paulin | |
| 7,409,452 B2 | 8/2008 | Ragnet et al. | |
| 8,200,661 B1 * | 6/2012 | Pearce et al. .................. 707/721 |
| 2003/0154289 A1 * | 8/2003 | Williamson et al. .......... 709/227 |
| 2003/0217144 A1 * | 11/2003 | Fu et al. ........................ 709/224 |
| 2004/0111488 A1 * | 6/2004 | Allan ............................ 709/217 |
| 2006/0005132 A1 * | 1/2006 | Herdeg, III ................... 715/704 |
| 2006/0155807 A1 * | 7/2006 | Loupia et al. ................. 709/203 |
| 2007/0050844 A1 * | 3/2007 | Lebel ............................. 726/13 |
| 2008/0120257 A1 * | 5/2008 | Goyal et al. .................... 706/12 |

(Continued)

FOREIGN PATENT DOCUMENTS

EP         0401975        12/1990

*Primary Examiner* — Liangche A Wang
*Assistant Examiner* — Johnny Aguiar
(74) *Attorney, Agent, or Firm* — Hewlett-Packard Patent Department

(57) ABSTRACT

Disclosed is a system and method for representing user interaction with a web service. The method comprises the steps of: acquiring a representation of the actions of a user performing a task with the web service; analyzing the acquired actions to determine semantics and at least one variable describing the user actions; and representing the semantics and the at least one variable in at least one script file, the at least one script file supporting performance of user interaction with the web service based on the semantics and a value provided for the variable.

16 Claims, 4 Drawing Sheets

(56) References Cited

U.S. PATENT DOCUMENTS

| | | |
|---|---|---|
| 2008/0126931 A1 | 5/2008 | Kojima et al. |
| 2009/0089404 A1* | 4/2009 | Guo .............................. 709/219 |
| 2009/0144625 A1 | 6/2009 | Muller et al. |
| 2009/0222727 A1* | 9/2009 | George et al. ................. 715/704 |
| 2010/0082778 A1* | 4/2010 | Muilenburg et al. ......... 709/220 |
| 2010/0095208 A1* | 4/2010 | White et al. .................. 715/704 |
| 2010/0121777 A1* | 5/2010 | McGonigal et al. .......... 705/347 |
| 2010/0125802 A1* | 5/2010 | Huslak et al. ................. 715/760 |

\* cited by examiner

SYSTEM AND METHOD FOR REPRESENTING USER INTERACTION WITH A WEB SERVICE

BACKGROUND

Web services are web applications that can be invoked via a Uniform Resource Locator (URL). Web service interfaces are typically complex as they require a user to remember websites, perform complex navigations, fill multiple forms and/or undertake a sequence of action, often across multiple sites, in order to accomplish a specific task. This can be further complicated in the field of mobile communication where difficulties may be provided due to mobile device limitations (such as screen size, functionality restrictions, etc.) and connectivity issues, for example.

An appliance or widget model for customized packaging of complex actions or configurations to perform a specific single function is a known paradigm of simplification. For example, a weather widget may be activated to obtain weather information. Since different users perform different personal tasks on the web, and possibly in diverse ways, use of pre-packaged widgets does not scale. Also, creating a personal widget or appliance today means development of new web applications which mandates programming knowledge at least one of Java, JSP, Servlets, AJAX, JavaScript, Flex or similar technologies.

BRIEF DESCRIPTION OF THE DRAWINGS

For a better understanding of the invention, embodiments will now be described, purely by way of example, with reference to the accompanying drawings, in which.

DETAILED DESCRIPTION

Figure 1:
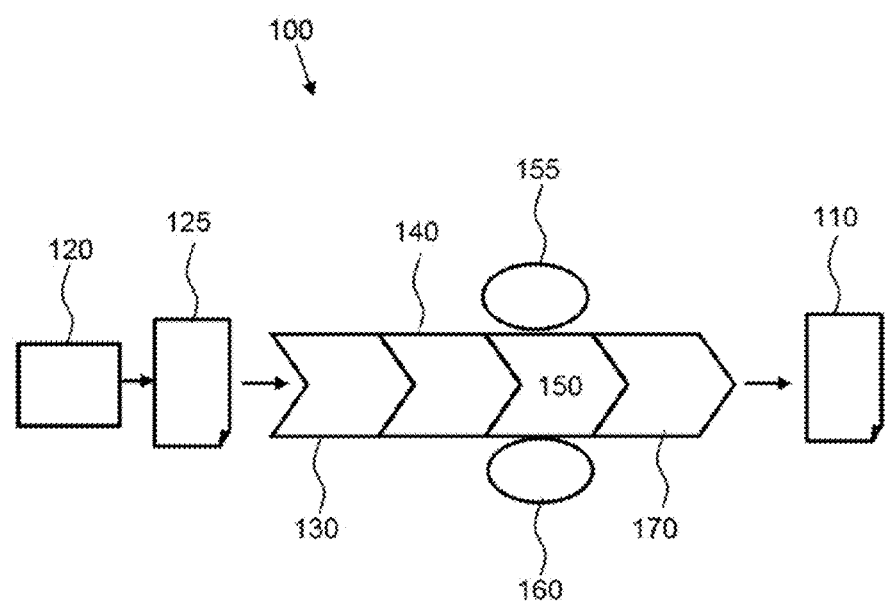
FIG. 1 illustrates the authoring environment for generating a script file according to an embodiment, the script file representing user interaction with a web service.

Embodiments provide a platform for developing personal software packages or appliances (hereinafter referred to as "widgets") simply by undertaking browser actions and without programming knowledge. Such widgets may then be invoked (or executed) in various different ways using various different devices. These widgets may also be shared for use by others.

Thus, there is provided a system that provides for automatic program generation enabling an end-user to create new widgets for completing favorite or regular tasks on the web.

Embodiments use a system that receives a sequence of user web actions or user web browser operations. The system then analyses the received action and associates them with higher level semantics to describe the users actions or intent so as to represent the user's task. The action sequences may be executed at a later time with different input parameters and/or variable values when a similar task arises in future. Embodiments may also transform the user actions into a web program and/or an executable application (such as a widget) to enable re-execution from a range of different client devices. Thus, embodiments provide a scalable mechanism to package typical user interaction patterns into instances which can be invoked using a single action (such as a single mouse-click) via an intuitive or simple interface appropriate for a client device. In other words, embodiments may simplify the use of web services so that a user can perform tasks with just a single click from different devices.

For the avoidance of doubt, reference to web services should be understood to include applications using conventional website-based or portal-based interfaces.

According to one aspect, there is provided a method for representing user interaction with one or more web services comprising the steps of: acquiring a representation of the actions of a user performing a task with the web service; analysing the acquired actions to determine semantics and at least one variable describing the user actions; and representing the semantics and the at least one variable in at least one script file, the at least one script file supporting performance of user interaction with the web service based on the semantics and a value provided for the variable.

According to another aspect, there is provided a method for representing task-based user interaction with a web service comprising the steps of: acquiring a sequence of, actions performed by a user of a web service; analyzing the actions to determine semantics and at least one variable which represent the recorded sequence of actions; and representing the semantics and variables in at least one file.

Thus, a users personally valuable web interaction across multiple web sites may be packaged into a simplified interaction. To enable an end user to easily specify such an interaction, embodiments allow the user to perform the interaction once on his web browser, which then records these browser actions and performs a semantic analysis of the actions and the web pages on which the actions were performed in order to generate a personal widget (TaskLet) which represents the user actions. The TaskLet can be invoked from different devices to perform the user actions at a later time. Further, the widget may be associated with a unique address (such as a Uniform Resource Locator (URL)) so as to be selectable to remotely initiate or invoke the performance of the user action(s) represented by the widget through other modalities.

By storing these widgets on remotely located storage system or server which are accessible via a communication network, the widgets can be invoked using a suitable communication device that can access the storage system or server via the communication network. Thus, a mobile telephony device can be used to invoke a widget using a mobile web browser, a short message service (SMS) message or even a voice commence, for example. This simplified interface to a personal task will enable non-Internet-enabled very low-end mobile phones to access Internet. Further, it may spare a great deal of non-productive time that would otherwise be spent executing frequent web-service interactions.

Embodiments define a concept called a TaskLet which represents a task-based personal interaction pattern and also provide a platform for automatically creating, sharing and executing TaskLets.

A TaskLet is used to capture and represent a user's preferred way of accomplishing a task. These TaskLets can be user-created, shared, customized and composed with other TaskLets and web services. For example, if a user frequently goes on 2-day trips from Bangalore to Delhi by Jet Airways, the user can create a custom TaskLet which, given just the date of travel, can book his regular flights and even reserve a hotel room (at his favorite hotel).

FIG. 1 illustrates the authoring environment 100 for generating a Task Model 110 according to an embodiment.

A recording process 120 is used to record browser actions (referred to as "BARs") 125 of a user. To achieve this the web browser application can be modified to record a user's web browser actions by recording the user actions into a file. For example, a users click of a button can be recorded by the modified web browser as button-click at x=100, y=200, wherein the values of the x and y variables records the x and y coordinates of the cursor when the button was clicked. Alternatively, a browser plug-in may be added into a web browser so as to record a user's web browser actions. The plug-in modifies HTML pages shown to the user to introduce java-scripts at all 'actionable' elements of the HTML DOM tree. Any action on this modified HTML page will be captured and written out like example provided above for the modified web browser. Purely by way of an example, such a browser plug-in may be implemented by building upon a public domain tool called "Greasemonkey" (a FireFox™ extension by Anthony Lieuallen, Aaron Boodman, Johan Sundström and available from http://www.greasespot.net).

The BARs are then parsed and analyzed to remove the instance-level detail. More specifically, the BARs 125 undergo a cleaning and templatization process 130.

In the cleaning and templatization process 130, firstly, the BAR action is converted to a semantic form where "button click at x=100 y=200' is converted into a semantic representation such as 'SUBMIT for m=employee-registration", for example. This is achieved using a BAR code parser together with a HTML analyzer that associates the 'click actions' to 'DOM structure of the web page'. Certain elements of these new representations can contain input parameters, such as "TEXT_INPUT John as name" having "John" as a potential input parameter. Also, "HYPERLINK Gemini" may have 'Gemini' as a potential input 'Gemini'. Such elements that can be represented as parameters are automatically identified and are replaced with variable names in the semantic representation. "TEXT_INPUT $var1 as name"

The results of the cleaning and templatization process 130 are then passed to a parameterization process 140 which introduces variables instead of specific instance values. At the end of the cleaning and templatization process 130, a list of possible input parameters for a specific interaction pattern is generated, which can then be used to determine a list of free and bound variables for the task. A free variable is one which may change its value on future execution of the task, while a bound variable of a task typically retains its value across multiple executions of the task. For example, the user may be prompted to specify if for subsequent runs, they wish to be able to change parameters such as 'date' and/or 'destination' of a flight booking TaskLet. Alternatively, the user may be asked to perform the action multiple times with different input parameters and the system can automatically determine the free and bound variables by analyzing the differences, in the inputs used on multiple recordings. The task is now represented as a script template together with a set of files defining free/bound variables and the action-analysis data. Of course, it will be appreciated that the task may be represented using a single script file comprising a representation of the task, variables and action-analysis data. This new representation of web interactions can be treated as new language for programming web-based applications, where each web action is an instruction and variables represent potential alternative actions on web pages. Further since the above program itself was not programmer-written, but was automatically generated when the user performed the web actions using a web browser, it is an instance of a technical area called Programming-By-Demonstration or Programming-By-Example, here performed in the context of web interactions.

The actions are then optimized in an action optimization process 150 based on website 155 and user 160 models. Such optimizations enable faster execution of web actions and eliminate spurious actions.

The optimizer analyses the intermediate representation of the web instructions to determine actions that can be eliminated, by looking for common patterns. For example "GOTO http://msn.com" followed by "GOTO http://hp.com" clearly mean the first one is not used. Another "GOTO http://msn.com; "HYPERLINK Horoscope" can possibly be replaced with "GOTO http://msn.com/horoscope". The results of the optimization process 150 are then passed to a TaskLet generator 170 which generates the task model which primarily consists of a TaskLet Template Script (TTS) file, representing the user actions. The task model may also comprise further files defining free and/or bound variables and user data, for example.

The TTS supports replay of user's task (the recorded user interaction with multiple web sites) at a later time based upon new values provided for variables using possibly new modes of interaction (such as SMS, for example).

The TaskLet authoring environment 100 comprises a plurality of modules, each being appropriately adapted to perform a function which supports generations of TaskLets. By way of example, a TaskLet authoring environment according to an embodiment comprises an Input Format Handler (IFH) module, a task generalizer module, an action analyzer, a variable generator, a web page analyzer, and a user data parameterizer.

While the primary form of generating a TaskLet is through Programming-by-demonstration (by recording the user actions on the web browser), the embodiment allows other alternate mechanisms to specify the web task or user actions, such as human written instructions provided either directly in the TaskLet script language or in a natural language, or any other graphical tool or User Interface (UI) that enables the user to specify actions defining a web task or user interaction with a web service. Every such different way of task input will be processed by an Input Format Handler (IFH) adapted to handle many input formats of input actions. A specific example of an IFH is the BAR parser described earlier which is adapted to understand the BAR format 125.

A TaskLet generalizer module performs the process of TaskLet cleaning, templatization 130 and parameterization 140. The variable generator creates and maintains the set of variables provided as a result of templatization 130 of the task. The action analyzer creates and analyses an in-memory intermediate representation of the task actions to determine optimizable patterns used by the TaskLet optimizer 150. The variable generator also analyses multiple user action recordings to determine free and bound variables for automatic parameterization. A web page analyzer is used to analyze the web pages on which the actions were performed in order to extract and add to semantics of the task. For example, the visual labels for widget inputs are extracted from the page semantics for every free variable. A user data parameterizer is provided as a graphical interface allowing a user to identify changing variables (and possible values for the variable) across multiple tasks/interactions.

Figure 2:
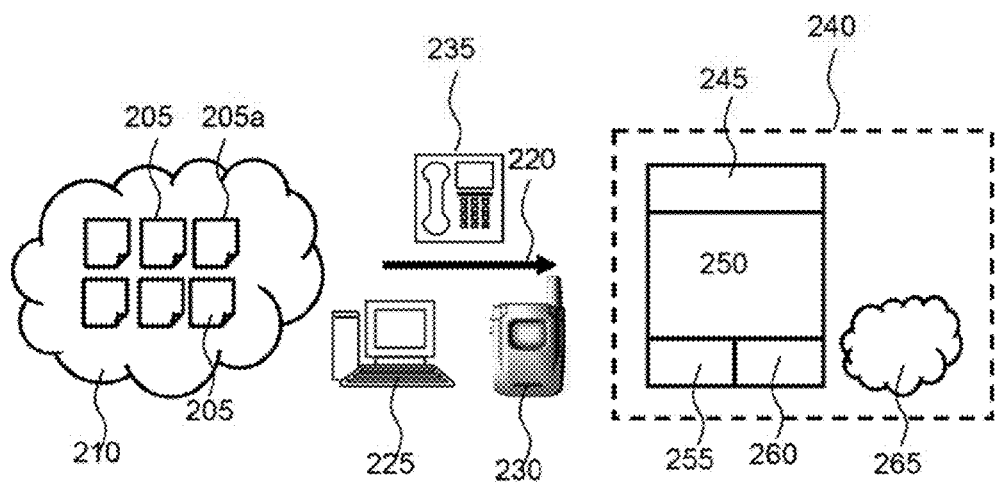
FIG. 2 illustrates the environment in which scripts may be stored and used according to an embodiment.

FIG. 2 illustrates the environment in which TaskLets may be stored and used according to an embodiment.

Task. Models (or TaskLets) 205 generated according to an embodiment are stored in and/or registered to a remote storage system, otherwise referred to as a TaskLet repository 210. The TaskLet repository 210 is accessible via a communication link 220 so as to enable sharing, adaptation, searching and execution of the TaskLets 205. By way of example, suitable communication devices, such as a computer 225, mobile telephony device 230 or a VoIP telephone 235, can access the TaskLet repository 210 via the communication link 220. Further, each TaskLet 205 is associated with a unique address (such as a Uniform Resource Locator (URL)) enabling it to be individually selectable and/or executable. In other words, the TaskLet repository 210 is a repository of user tasks. Here it provides a cloud (web) service that enables task execution as a web service.

A TaskLet execution environment 240 comprises a TaskLet execution engine 250 (e.g. an appropriately programmed processor), a store of user data 245, a change handler 255 and a post processing unit 260. The TaskLet execution environment 240 also provides access to web sites and web services 265.

Thus, by way of example, a mobile telephony device 230 can be used to invoke a TaskLet 205a by entering the URL associated with the TaskLet 205a into a web browser provided by the mobile telephony device 230. A data request containing the URL generated by the web browser is then received by the repository 210 via the communication link 220 and the TaskLet 205a uniquely associated with the URL is provided to the TaskLet execution engine 250 via the communication link 220.

The TaskLet 205a is then interpreted by the TaskLet execution engine 250 taking account of the stored user data 245 and processing by the post processing unit 260 (according to output language requirements, for example).

The execution and effect of the TTS instructions in a Task model can depend on the current state of the HTML page on which the action needs to be executed. The change handler 255 determines the differences between the original HTML page and the current page from the website and determines the exact changes that may have happened to the webpages. This analysis together with the semantic instructions helps the TaskLet to be executed even when the web pages have been modified. For example, the "SUBMIT" button may have moved from (x,y)=(100,200) to (x,y)=(300,400), but the "SUBMIT" element on the for m="employee-registration" may not have changed.

In this way, the individual TaskLet 205a is invoked by the mobile telephony device 230 so as to perform a desired user interaction with a web service 265. The performance may simply repeat a previous web service interaction in its entirety, or may replicate a previous web service interaction using different values (provided by the user data 245, for example) for one or more variables so as to undertake a different but related interaction.

Figure 3:
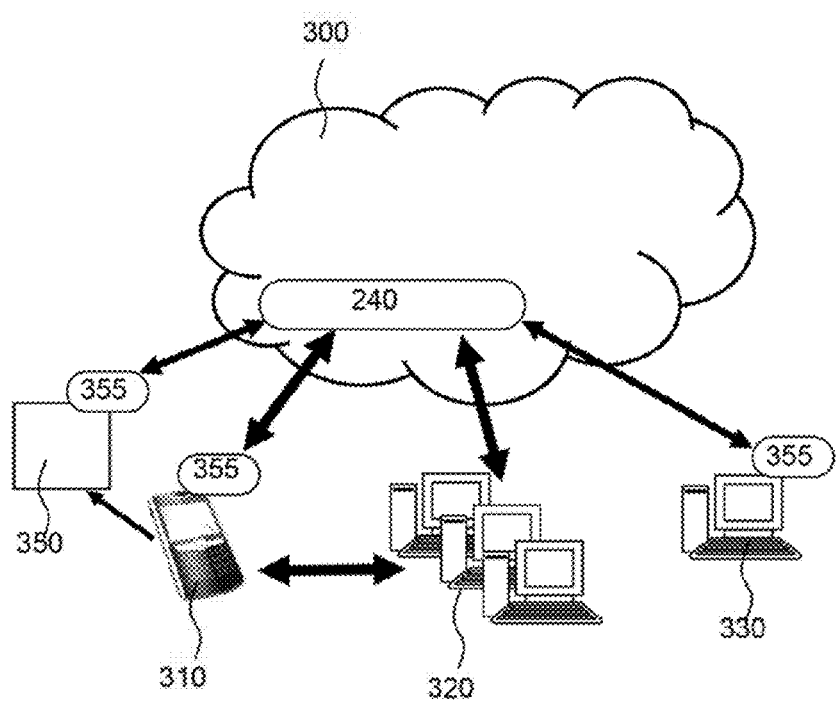
FIG. 3 illustrates an execution environment in which scripts may be used according to an embodiment.

FIG. 3 illustrates an execution environment in which TaskLets may be used according to an embodiment.

A communication network 300 providing a plurality of web services, including media transcoding, summarization and language translation, for example, is accessible to mobile communication devices 310 (such as mobile telephony devices, PDAs, etc.), Personal Computer (PC) networks 320, and single PCs 330 via a TaskLet execution environment 240 (similar to that of FIG. 2).

Provision of the TaskLet execution environment 240 as a web service thus enables voice/SMS based invocation from mobile phones through Voice/SMS Gateways 345 of a telecommunications infrastructure 350. Also, a client-side cache 355 on the mobile communication devices 310 enables TaskLets to be available or responsive when a communication link between the mobile communication device 310 and the TaskLet execution environment 240 is hindered or unavailable.

Additionally, the TaskLet repository may enable a full download of the a TaskLet to a client device, in which case, the user task represented by the task model of the TaskLet is transformed into a complete standalone Windows application that can be downloaded and executed on the client machine. One simple way of doing this is to package the TaskLet execution engine 240 and the TaskLet script as the core of the application and provide a graphical interface for the client application (widget).

Further, the TaskLet repository supports different web APIs (REST, SOAP, RSS feeds) for each TaskLet enabling composition and embedded use of TaskLets within other web services and web-based applications.

It will therefore be understood that TaskLets according to embodiment can be deployed on a client device, in a cloud of web services or at a telecom provider network. This enables intuitive web interaction through widgets, web browsers and from mobile phones via SMS and voice, for example.

For a better understanding, embodiments will now be described in the following sections.

Overall Architecture

As above, there is defined a 'TaskLet' for capturing a web-service interaction pattern. A TaskLet represents a user-specific way of performing a task with a web-service. For example, to book a flight from Bangalore to Delhi, a TaskLet will represent the browser action required to do the same (accessing the airline website, specifying source and destination airports, date(s), flight selection, and completing payment so as to obtain a booking reference number or electronic ticket). This TaskLet can be executed again at a later time with a different set of parameters so as to book a flight from Bangalore to Delhi on a different date and/or using a different payment method, for example. A TaskLet can be, created even for a simple task, such as applying for annual leave through a company website, completing a bank transaction, or checking the forecast for tomorrows tide, for example.

A TaskLet is created by the user undertaking the web-service interaction actions on a browser (see section below entitled "Creation of TaskLets" for more details. Once created, a TaskLet can be stored and/or registered with a personal repository. A user may use TaskLet stored in a different user's repository, with the TaskLet being appropriately adapted to the user (by binding with stored user data 245 for example).

Thus, when a same or similar task needs to be executed, the appropriate TaskLet is invoked using an appropriate mechanism (voice command, SMS message, mouse-click, touch gesture, etc.) which is mapped to a TaskLet execution URL. By addressing this URL, an instance of the TaskLet is executed by the execution engine 250 so as to perform the appropriate actions without further action being required by the user.

Creation of TaskLets

As mentioned above, embodiments record a user's actions to create new personal widgets. For this, the embodiments analyse the browser action recordings (BARs), extract the possible input parameters (by parsing the browser recording instructions and also analyzing the HTML pages on which the actions were performed) to perform parameterization and templatization of the recording.

This results in the generation of a special script called a TaskLet Template Script (TTS) which is then stored as a part of the Task model to the TaskLet repository of the user. An example of a TTS to convert a given input from Indian Rupees to Great British Pounds using a currency convertor website (www.xe.com) is provided below:

```
GOTO URL=http://www.xe.com/ucc/
INPUT position=1 TYPE=TEXT FORM_NAME=ucc
    ATTR=NAME:Amount
CONTENT=$TLVAR1
    SELECT    position=1  FORM_NAME=ucc   ATTR=NAME:From
CONTENT=$TLVAR2
    SELECT    position=1  FORM_NAME=ucc   ATTR=NAME:To
CONTENT=$TLVAR3
    SUBMIT    position=1  TYPE=IMAGE      FORM_NAME:ucc
ATTR=NAME:image
    EXTRACT TYPE=TEXT position=3 TYPE=H2
    ATTR=CLASS:XE TEXT=*
```

As will be noted from the exemplary script above, instead of specific syntactic raw actions on the web browser being captured, the script captures the operational semantics of the recorded interaction (for example, SUBMIT, SELECT, EXTRACT, HYPERLINK, etc.) which can be appropriately executed by the execution engine later according to the current state of the website.

Variable parameters (TLVAR1, TLVAR2, and TLVAR3) have also been created. These variables are bound at the time of TaskLet instantiation (i.e. when the TaskLet is invoked), and the values they take may be defined as appropriate or desired (for example, by the user, the website, user data, or any combination thereof).

An example of a TTS for completing a search for a research paper within a digital library (of HP® Labs) at a (http://lib.hpl.hp.com) is provided below:

```
GOTO URL=http://lib.hpl.hp.com/
HYPERLINK position=1 TYPE=A ATTR=TXT:ACMDigitalLibrary
INPUT position=1 TYPE=TEXT FORM_NAME=emp
    ATTR=NAME:UID
CONTENT=$TLVAR1
    SUBMIT position=1 FORM_NAME:emp ATTR=NAME:ACTION
    INPUT      position=1  TYPE=TEXT   FORM_NAME=qiksearch
ATTR=NAME:query CONTENT=$TLVAR2
    SUBMIT    position=1  TYPE=IMAGE FORM_NAME=qiksearch
ATTR=NAME:Go
    EXTRACT TYPE=HREF position=1 TYPE=A
    ATTR TEXT=*Pdf*
```

The above sample TTS for a TaskLet takes the title of a research, paper and returns the URL of the paper after authentication with employee id (in step 3). The variables TLVAR1 and TLVAR2 are bound at the time of execution. TLVAR1 is bound with the employee id and TLVAR2 with the title of the paper being searched. Note that TLVAR1 can be bound the first time a user receives this TaskLet and uses it.

It will be understood that the TTS provides a new procedural programming language for the Web. It comprises operators with web action semantics, and opcodes as primitive browser web actions. This language provides an extendable instruction set for newer type of web analysis (for example, thick opcodes: EXTRACT TABLE for semantic table extraction using techniques such as MDR and RoadRunner, TOPIC DETECT for detecting topics from web pages, etc). Further, an extendable instruction set may be provided for new web browser support (INTERPRET JavaScript, EXPAND XSL).

Slots are provided to enable for composite TaskLets to be constructed for undertaking more complex web interactions.

In the TTS, each user-determinable input becomes a program variable, each alternate selectable paths become a program variable, and the concept of a user-bound web variable and free-web variable is provided. Further, the TTS enables subsequent binding (i.e. binding at a later time) of user-bound variables, makes sharing a means of authoring.

TaskLets may be composed or chained with other TaskLets and/or web-services to provide more complex task workflows.

URL-Based Activation

Where embodiments store or register TaskLets with a repository, each TaskLet is allocated a unique TaskLet URL, which can then be used for invoking the TaskLet. If the TaskLet has unbound parameters (i.e. variables not having a value defined), standard URL conventions for passing arguments may be used. Thus, embodiments create a new paradigm of 'compressing a sequence of web actions' into a single web reference.

Dynamic Execution Engine

Invoking a TaskLet (by addressing its associated URL, for example) triggers the execution engine of a TaskLet after instantiation with appropriate parameter values. The execution engine interprets the TTS script and instructions to perform the required action on the website (web page). To accommodate dynamic content on websites, the execution engine can perform structural modeling of the websites (DOM structure is extracted) and uses the DOM attributes captured in the TTS to perform the action on the website.

For example, the first SELECT instruction in the exemplary script above is describing that the execution should fill up text box named "From" on the HTML FORM named "ucc" with the current value of the variable "TLVAR1".

The execution engine is like a servlet engine in that its action results in a web service invocation to output only the required result. This enables execution of TaskLets from simple browsers available on mobile devices. Other embodiments can implement a Smart Telecom Gateway to map a user's telephone number to a TaskLet URL and perform appropriate speech-to-text and text-to-speech conversions at the input and output of the TaskLets, thereby enabling voice-based interactions with TaskLets. These text/speech conversions are driven by dynamically generated voiceXML template files every time a new TaskLet is created, enabling a mechanism for dynamic voice-activated services.

Tracking and Audit Logs

An additional value provided by embodiments executing personal tasks through TaskLets (apart from simplification) is the ability to track all web actions (for example transactions) performed using TaskLets. The execution engine can be configured to log all the parameters and actions performed through the engine. This log can be searched at a later point in time to bring out useful history information which is not possible today with conventional browser-based electronic transactions. For example, a user may use this to search for all the booking reference numbers of his/her Delhi visits in the previous six months, or to search for all transactions in the previous month where he/she spent more than a specific amount of money.

Figure 4:
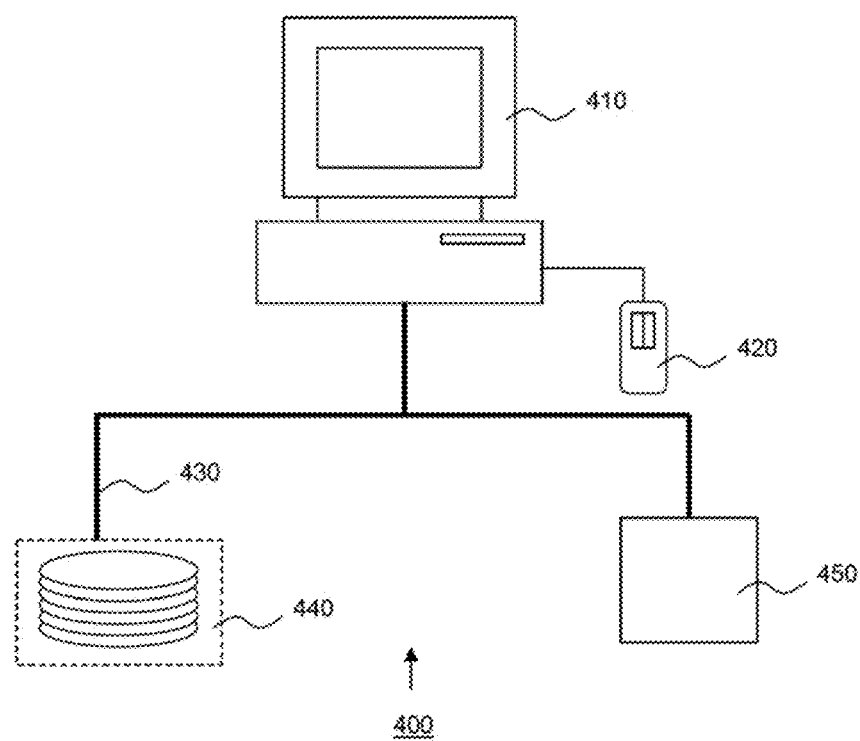
FIG. 4 is a diagram of a system according to an embodiment.

FIG. 4 shows a data processing system 400 in accordance with an embodiment of the present invention. A computer 410 has a processor (not shown) and a control terminal 420 such as a mouse and/or a keyboard, and has access to a TaskLet database stored on a collection 440 of one or more storage devices, e.g. hard-disks or other suitable storage devices, and has access to a further data storage device 450, e.g. a RAM or ROM memory, a hard-disk, and so on, which comprises the computer program product implementing a method according to an embodiment. The processor of the computer 410 is suitable to execute the computer program product implementing a method in accordance with an embodiment. The computer 410 may access the collection 440 of one or more storage devices and/or the further data storage device 450 in any suitable manner, e.g. through a network 430, which may be an intranet, the Internet, a peer-to-peer network or any other suitable network. In an embodiment, the further data storage device 450 is integrated in the computer 410.

Embodiments enable TaskLets to be deployed either on a client device (desktop computer, laptop computer, mobile telephony device, personal digital assistant, etc.) or hosted as a cloud (web) service with a client-interfacing component. Because the platform decouples the task execution from the interface, it enables more simple and natural interfaces to be used from devices.

User-created TaskLets may be shared and executed in the field of mobile communications. Furthermore, since TaskLets can be addressed via a URL, embodiments separate the program from its interaction enabling familiar interfaces to be used for web transactions.

Embodiments enable simplification of personally valuable tasks on the web. The invocation mechanisms (such as mobile devices, SMS messages and voice-based commands) enable users to, use web-services without being aware of the even the URL of the website. Further, user adaptation while sharing TaskLets bridges the gap between an expert user and inexperienced user of the end widget.

Using embodiments, users can create new web services over existing web tools and portals without any explicit programming knowledge. Simple actions on the browser can be used to automatically generate web applications, empowering end users to create their own services. These services, if hosted on a telecom infrastructure (such as a cloud) can be a useful for hosted services as well as pay-per-use models for personal services.

End-user's can share their knowledge of a specific web interaction pattern with other users and other devices. For example, personal TaskLets created by one user can be shared with other users by having the required levels of customization by just sharing the URL of the TaskLet.

Also users can track personal web interactions and search the same at a later point in time:

Embodiments have the ability to capture web interactions in a website independent way, possibly enabling execution of similar tasks on multiple similar websites.

While specific embodiments have been described herein for purposes of illustration, various modifications will be apparent to a person skilled in the art and may be made without departing from the scope of the invention.

The invention claimed is:

1. A method for representing user interaction with a web service comprising:
    acquiring a representation of actions of a user performing multiple iterations of a task with the web service;
    analyzing the acquired actions to determine semantics and a plurality of variables describing the user actions, each variable being an input to the web service that the web service requests the user to enter during the multiple iterations of the task, the variables comprising free variables and bound variables, where which of the variables are the free variables and which of the variables are the bound variables is determined automatically without prompting the user, by analyzing differences in the actions of the user across the multiple iterations of the task;
    representing the semantics and the variables in at least one script file, the at least one script file supporting performance of user interaction with the web service based on the semantics and values provided for the variables, where each bound variable has a constant value over multiple executions of the at least one script file, and each free variable has a value that is changeable over the multiple executions of the at least one script file; and
    associating the at least one script file with a unique uniform resource locator (URL) address that is selectable to initiate performance of user interaction with the web service,
    wherein the unique URL address is selectable by different user devices to invoke and execute the user interaction.

2. The method of claim 1, wherein analyzing further comprises determining potential values of the variables, and wherein representing further comprises representing the potential values in a file.

3. The method of claim 1, wherein analyzing comprises parsing the acquired actions and analyzing the web service on which the actions were performed.

4. The method of claim 1, wherein the value of each free variable is either provided by a user, or determined from user data.

5. The method of claim 1, wherein acquiring a representation of the actions of a user comprises recording actions of a user performing a task with the web service.

6. A method of using a web service comprising:
    generating at least one script file supporting performance of user interaction with the web service by representing a user interaction with the web service according to claim 1; and
    performing an interaction with the web service based on the semantics and a value provided for each free variable.

7. The method of claim 1, wherein during each iterations of the task, the user provides values for the variables,
    and wherein for each execution of the at least one script file, the variables that were previously determined as being bound have preset values such that the user is not prompted to enter values for the bound variables, and the variables that were previously determined as being free have non-preset values such that the user is prompted to enter the values for the free variables in each execution of the at least one script file.

8. The method of claim 1, further comprising:
    receiving a command to invoke performance of the at least one script;
    in response to receiving the command, executing the at least one script to interact with the web service; and
    during execution of the at least one script to interact with the web service,
        requesting input from the user for each free variable while the at least one script interacts with the web service.

9. The method of claim 8, further comprising, during execution of the at least one script to interact with the web service, providing output to the user as received from the web service during interaction of the at least one script with the web service.

10. The method of claim 8, further comprising, during execution of the at least one script to interact with the web service, suppressing output to the user as received from the web service during interaction of the at least one script with the web service, except for the output specified by the at least one script.

11. The method of claim 8, further comprising, during execution of the at least one script to interact with the web service, decoupling the web service from a device that the user is operating to provide a different interface for the web service at the device.

12. The method of claim 1, wherein the at least one script provides for a different interface by which the web service is interacted with by a user.

13. A non-transitory computer-readable medium storing a computer program that when executed on a computer, performs a method comprising:
acquiring a representation of actions of a user performing multiple iterations of a task with a web service;
analyzing the acquired actions to determine semantics and a plurality of variables describing the user actions, each variable being an input to the web service that the web service ordinarily requests the user to enter during the multiple iterations of the task, the variables comprising free variables and bound variables, where which of the variables are the free variables and which of the variables are the bound variables is determined automatically without prompting the user, by analyzing differences in the actions of the user across the multiple iterations of the task;
representing the semantics and the variables in at least one script file, the at least one script file supporting performance of user interaction with the web service based on the semantics and values provided for the variables, where each bound variable has a constant value over multiple executions of the at least one script file, and each free variable has a value that is changeable over the multiple executions of the at least one script file; and
associating the at least one script file with a unique uniform resource locator (URL) address that is selectable to initiate performance of user interaction with the web service,
wherein the unique URL address is selectable by different user devices to invoke and execute the user interaction.

14. The non-transitory computer-readable medium of claim 13, wherein analyzing comprises parsing the recorded actions and analyzing the web service on which the actions were performed.

15. The non-transitory computer-readable medium of claim 13, wherein analyzing further comprises determining potential values of the variables, and wherein representing further comprises representing the potential values in a file.

16. A system comprising:
data storage means for storing information;
a computer program memory comprising the non-transitory computer-readable medium of claim 13; and
a data processor having access the computer program memory and the data storage means, the data processor being arranged to execute said computer program.

* * * * *